J. C. Wightman,

Steam Pump.

No. 101,334.  Patented Mar. 29, 1870.

Joseph C. Wightman.

Witnesses
Joseph M. Wightman
Wm. C. Phelan

UNITED STATES PATENT OFFICE.

JOSEPH C. WIGHTMAN, OF NEWTON, ASSIGNOR TO THOMAS P. PROCTOR, TRUSTEE, OF WEST ROXBURY, MASSACHUSETTS.

STEAM WATER-ELEVATOR.

Specification forming part of Letters Patent No. 101,334, dated March 29, 1870.

*To all whom it may concern:*

Be it known that I, JOSEPH C. WIGHTMAN, of Newton, in the county of Middlesex, State of Massachusetts, have invented certain Improvements in Steam-Pumps, designed more expressly for attachment to stoves, ranges, or other domestic cooking or heating apparatus as used in dwellings, for the purpose of drawing water from the cistern or well, and elevating the water to the tank or reservoir in the upper portion of the house, from which it may be afterward drawn from pipes, as desired, of which the following is a specification.

Figure 1:
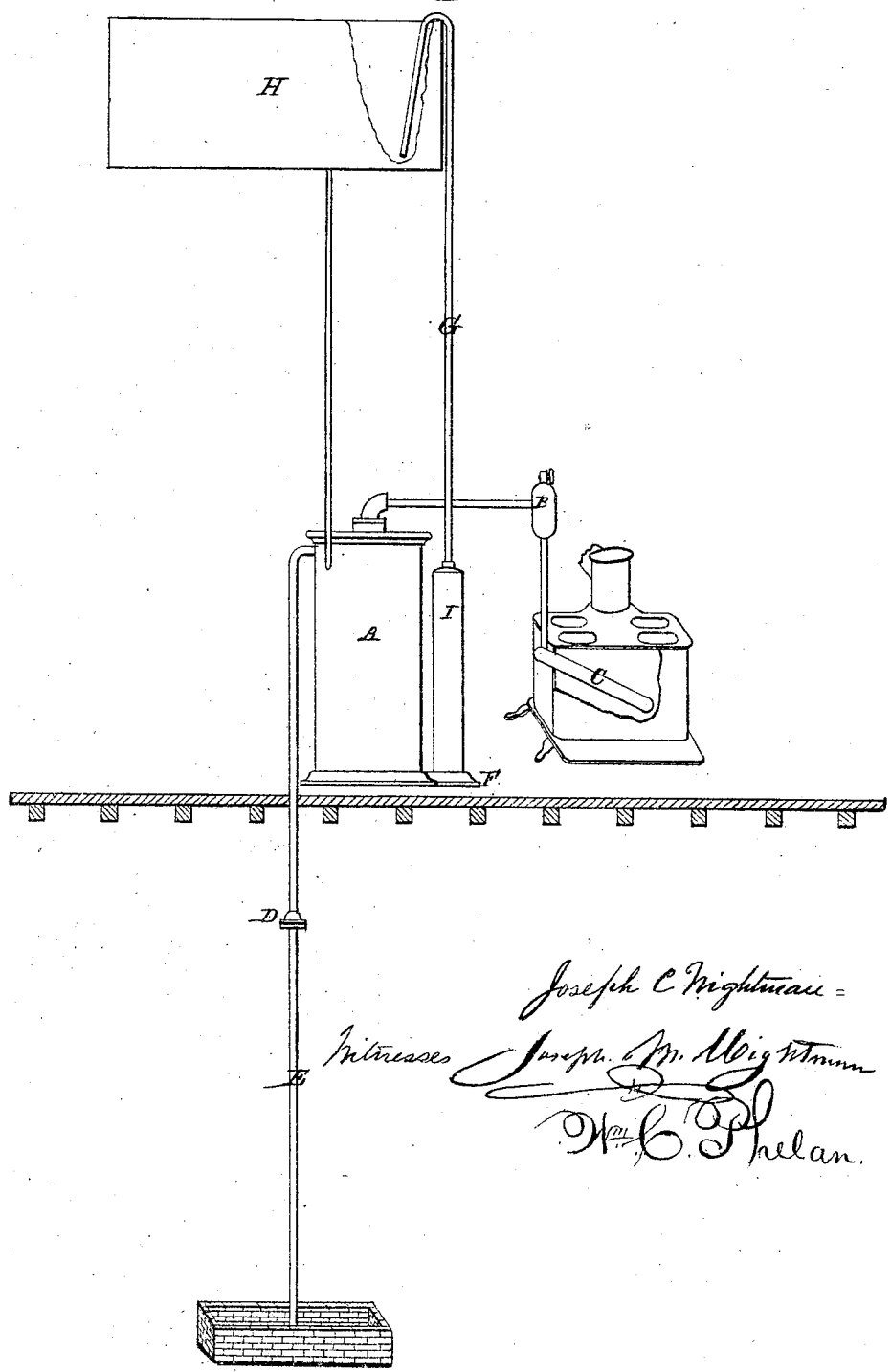
Figure 2:
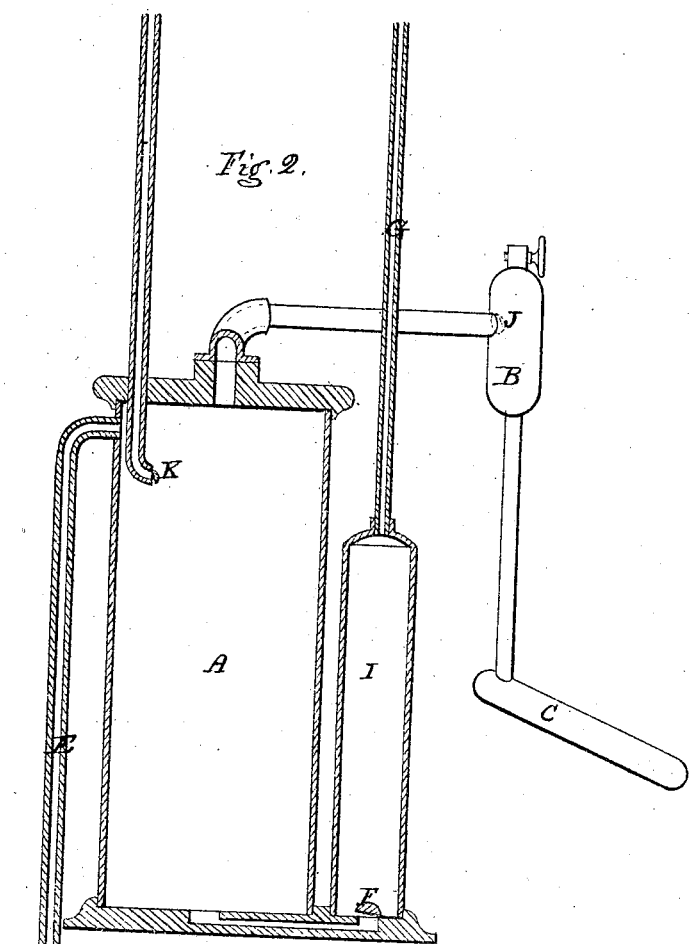
Figure 3:
Figure 4:

Figure 1 is a view of the apparatus attached to a stove. Fig. 2 is a sectional view of the apparatus. Fig. 3 is a sectional view of the valve J. Fig. 4 is a plan view of the valve J.

The apparatus consists of the following parts: A, the main chamber or barrel of the pump; B, the chamber regulating supply of water to be converted into steam, and connected with the steam-generator and main chamber, as shown in Figs. 1 and 2; C, the steam tube or generator lying diagonally in the fire-box of the stove; D, the inlet-valve from well or cistern; E, the inlet or suction pipe leading to cistern or well; F, the outlet-valve from main chamber to tank; G, the outlet-pipe leading from main chamber to the water-tank; H, the tank at top of house; I, the condensing-chamber over valve, and forming water-receptacle, as also part of pipe G; J, the automatically-working and perforated valve, allowing passage of water from main chamber to supply-chamber; K, the automatically-working valve and the pipe leading to the tank or uplet-pipe.

The operation of the apparatus is as follows: The steam-generator C being first firmly fixed in the stove, the other parts are connected, as shown in the drawings, in such manner as to be air-tight. The whole apparatus is then filled with water, including the steam-generator, pipes, supply-chamber, &c. Upon building fire in the stove the water contained in the steam-generator C and the supply-chamber B, with pipes connecting the same, is converted into steam, and, passing through the orifice in the valve J, presses the water out of the main chamber A, past the outlet-valve F, up the pipe G, into the tank H. When the water contained in the supply-chamber B and steam-generator C is all converted into steam, the pressure upon the valve F will come from the column of water being raised in the uplet-pipe G, and close it. The whole apparatus will then be filled with steam. It is well known that every portion of water converted into steam leaves the air originally contained in the water, and if this air were allowed to accumulate in the apparatus a few strokes would render the action of the apparatus uncertain, and, finally, by the destruction of the vacuum, prevent the action of the pump. To avoid this, the supply-chamber is always made of such capacity that when its water contents are converted into steam the steam will force most of the air so contained by the uplet-valve F, so that but a small and never-accumulating quantity remains in the apparatus. It will also be seen that steam passing up the pipe G with the air will force the water in the pipe G to a greater or lesser height, and that when the steam condenses the water will fall back, making a water-hammer, with the attendant danger of bursting the pipe G. The column of water will return, also, with such force as to carry with it the air previously expelled from the apparatus, if it has not all been forced from the pipe G; and as the condensation in the pipe G will produce sufficient vacuum to open the valve F, there is danger that the air will pass back into the apparatus from which it was originally expelled, which would in a shorter or longer time render the apparatus inoperative. To overcome this, I place above the valve F a chamber, I, large enough to contain sufficient water to always condense steam necessarily passing the valve F, and as the danger from water-hammer is thereby obviated, the other danger from returning air is perfectly overcome. The water in the supply-chamber B and pipe and generator C being all turned to steam, and the water in main chamber having been entirely forced up to the tank H, I should, with an ordinary depth of well or cistern, wait for the surface condensation on the main chamber A to produce sufficient vacuum to start the water from the cistern through the pipe E and valve D, delivering the water at or near the top of the main chamber A, and as the water fell through the remaining steam it would condense the remainder and render the vacuum perfect. The water having filled the main chamber A, would flow over to fill the supply-chamber B and generator C, opening as it did so the perforated valve J, thereby letting in so large a volume of water as to condense the steam as rapidly as formed, by contact of the water with the heated generator C, and insuring an ample and fixed supply of water to be turned into steam. After the passage of the water, the valve will close by gravity, or otherwise, thereby holding the water in the supply-chamber B and steam-generator C, but admitting the outlet of the steam through the small orifice in the valve J, through which orifice the steam will pass, and the operation will take place as in the first instance; and this alternate generation and pressure of steam, and the vacuum formed by the condensation of steam, will continue automatically, so long as a fire is kept around the generator. When the fire is allowed to go out, the whole apparatus fills with water, and commences its action so soon as heat is applied to the generator C. Under the foregoing circumstances, where the distance from the cistern or well is so short in a perpendicular line that condensation in the main chamber A takes place with all the rapidity necessary to fill the whole apparatus, either to produce rapid action or to prevent the generator C becoming so hot and for such a time as to burn out for want of water to absorb the heat, the valve K and pipe therefrom would be unnecessary; but this valve and pipe become necessary under the following conditions: first, where rapid condensation is needed; second, where the supply-chamber B is placed so far above suction that, while the main chamber A will be filled by suction or pressure of air, it becomes necessary to use other means to supply the necessary amount of water for steam. This valve K, I call a "condense-valve," and is attached to the inside top of the main chamber A, opening inward, and opens a passage from the main chamber A into the pipe connecting with the outlet-pipe G, but preferably directly to the tank at the top of the house. When the steam is coming into the main chamber A, the pressure will keep this valve K closed; but as the condensation goes on, the pressure of the column of water will open this valve K, and, letting in through a small hole a stream of water, produce an instantaneous condensation, without regard to the surface condensation in the main chamber A. This condensation will fill the main chamber A from the well or cistern, and if the supply-chamber B is above the power of the air to force water from the main chamber A into it, the water will continue flowing through the hole opened by the opening of the valve K, and thereby fill the supply-chamber B and generator C.

There are many places in large cities where the water-pressure is sufficient to raise the water above the level where the pump would naturally be placed, but not sufficient to raise the water to the upper rooms or to the tank supplying them. This pressure would in many instances be objectionable, as the water might flow under too great head of pressure into the apparatus. To reduce the action of the apparatus to the status as where drawing water from below the level of its position, I simply weight, or hold by a spring of certain power, the inlet-valve D to such a point as will counterbalance the pressure of the water, or to such point as may be desired, rendering the weight or spring the equivalent of distance from source of supply.

The main chamber A may be placed beside the stove, but no part of it should be above the level of the valve J; or it may be placed at any distance from the supply-chamber B, either in a horizontal or perpendicular line, any position being accomplished by length and direction of connecting-pipes.

I claim—

1. An apparatus for raising and forcing water, when constructed and operating substantially as set forth.

2. The supply-chamber B, connected and operating for the purposes substantially as set forth.

3. The automatic perforated valve J, operating for the purposes substantially as set forth.

4. The condensing-chamber I, placed and operating substantially as described.

5. The condensing-valve K, operating for the purposes and placed substantially as described.

6. The steam-generator C, when operating in connection and combination with the supply-chamber B, and placed in such position, in contact with heat, as to allow of water flowing into it on an inclined plane, when constructed and operating substantially for the purpose herein described.

JOSEPH C. WIGHTMAN.

Witnesses:
JOSEPH M. WIGHTMAN,
THEO. L. KELLY.